United States Patent
Little

(10) Patent No.: US 7,240,593 B2
(45) Date of Patent: Jul. 10, 2007

(54) MINIATURE CUTTING INSERT HOLDER

(76) Inventor: Roger Little, 3329 E. 1/2, Sante Fe, TX (US) 77510

( * ) Notice: Subject to any disclaimer, the term of this patent is extended or adjusted under 35 U.S.C. 154(b) by 0 days.

(21) Appl. No.: 11/109,512

(22) Filed: Apr. 19, 2005

(65) Prior Publication Data

US 2006/0230890 A1 Oct. 19, 2006

(51) Int. Cl.
*B23B 29/02* (2006.01)

(52) U.S. Cl. .............................. 82/1.11; 82/158; 407/11; 407/101; 407/102

(58) Field of Classification Search ................. 82/1.11, 82/158; 407/11, 101, 102; 408/233, 238, 408/239 R
See application file for complete search history.

(56) References Cited

U.S. PATENT DOCUMENTS

| | | | | |
|---|---|---|---|---|
| 3,289,273 A | * | 12/1966 | Artaud | 407/101 |
| 3,686,729 A | * | 8/1972 | Cochran | 407/101 |
| 4,118,138 A | * | 10/1978 | Takacs et al. | 407/112 |
| 4,226,560 A | * | 10/1980 | Kraemer | 407/101 |
| 4,332,513 A | * | 6/1982 | Gowanlock | 407/101 |
| 4,509,886 A | * | 4/1985 | Lindsay | 407/102 |
| 4,606,680 A | * | 8/1986 | Striegl | 408/156 |
| 4,692,070 A | | 9/1987 | Shikata | |
| 4,850,255 A | * | 7/1989 | Pruvot et al. | 82/160 |
| 5,004,379 A | | 4/1991 | Little | |
| 5,112,163 A | * | 5/1992 | Veilleux | 407/101 |
| 5,388,487 A | * | 2/1995 | Danielsen | 82/158 |
| 5,555,784 A | * | 9/1996 | Muendlein et al. | 82/158 |
| 5,688,080 A | * | 11/1997 | Hedlund | 407/101 |
| 5,709,508 A | * | 1/1998 | Barazani et al. | 407/101 |
| 5,769,577 A | * | 6/1998 | Boddy | 408/231 |
| 5,833,403 A | * | 11/1998 | Barazani | 407/101 |
| 6,146,060 A | * | 11/2000 | Rydberg et al. | 407/40 |
| 6,146,061 A | * | 11/2000 | Larsson | 407/103 |
| 6,312,199 B1 | * | 11/2001 | Sjoden et al. | 407/11 |
| 6,312,201 B1 | * | 11/2001 | Nagaya et al. | 409/234 |
| 6,880,437 B2 | * | 4/2005 | Sjoo et al. | 82/158 |
| 6,960,049 B2 | * | 11/2005 | Inayama | 407/103 |
| 6,974,281 B2 | * | 12/2005 | Hansson et al. | 407/66 |
| 7,001,114 B2 | * | 2/2006 | Blucher et al. | 407/103 |
| 2003/0185638 A1 | * | 10/2003 | Sjoo et al. | 407/102 |

* cited by examiner

*Primary Examiner*—Monica Carter
*Assistant Examiner*—Sara Addisu
(74) *Attorney, Agent, or Firm*—Leon D. Rosen

(57) ABSTRACT

A holder (20) for a cutting insert (12), which includes a head (22) with a pocket (24) for holding the cutting insert and a bar device (26) for supporting the head, allows the use of a removable head for a miniature head and bar device that fits into a small hole in a workpiece, and allows rapid and easy replacement of the head. The head has a front part (42) of small height for holding the cutting insert and has a taller rear part (40) of the same height as the bar device. The head rear part has a screw-receiving hole (56) that extends at a downward-rearward incline (A) into a corresponding threaded hole (62) at the front of the bar device. The head and bar device respectively have a recess (70) and a projection (74) that lie around the screw-receiving holes and that align the head and bar device. A coolant passageway system (92) in the bar device provides coolant for both right and left hand heads.

3 Claims, 2 Drawing Sheets

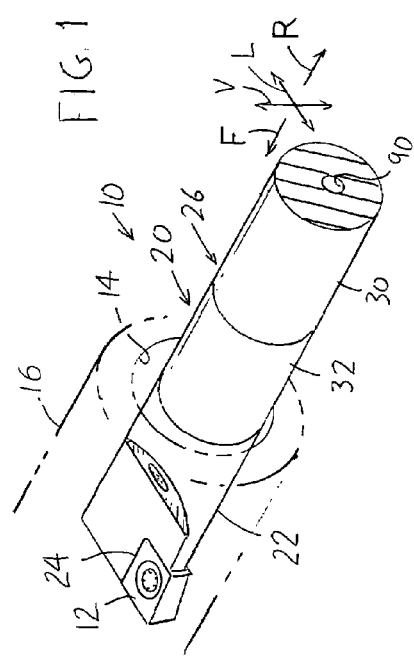
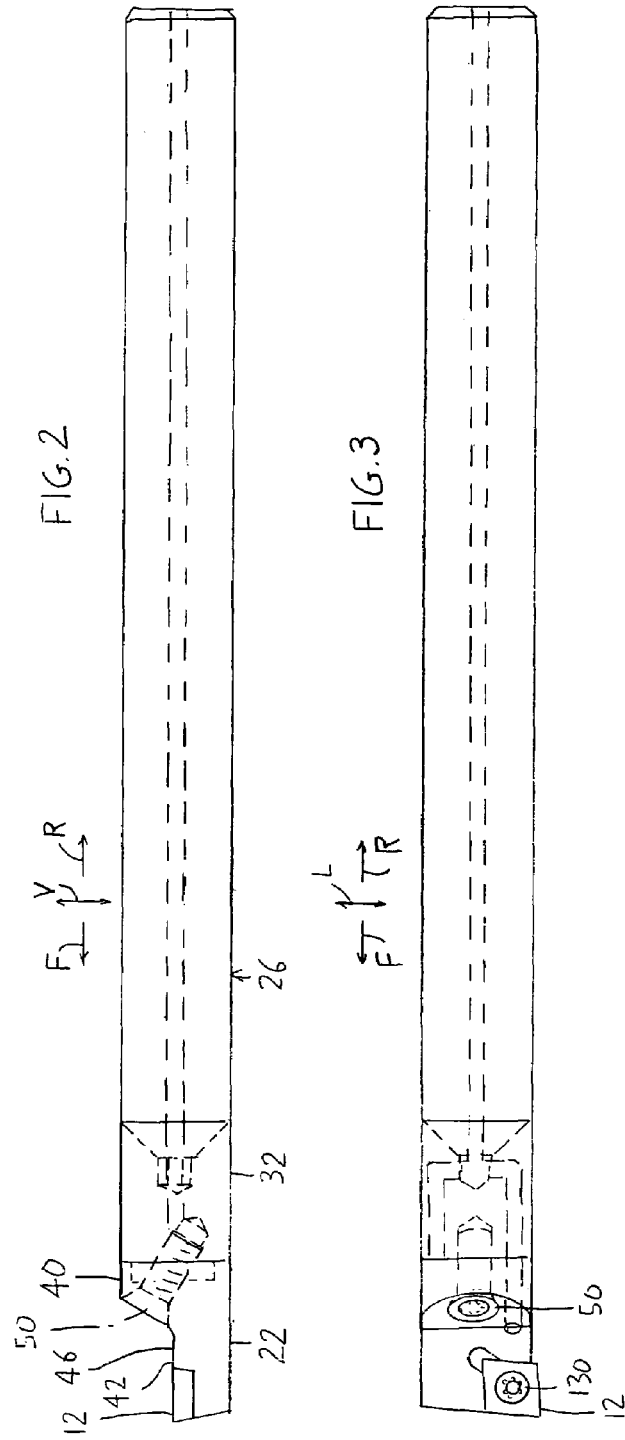

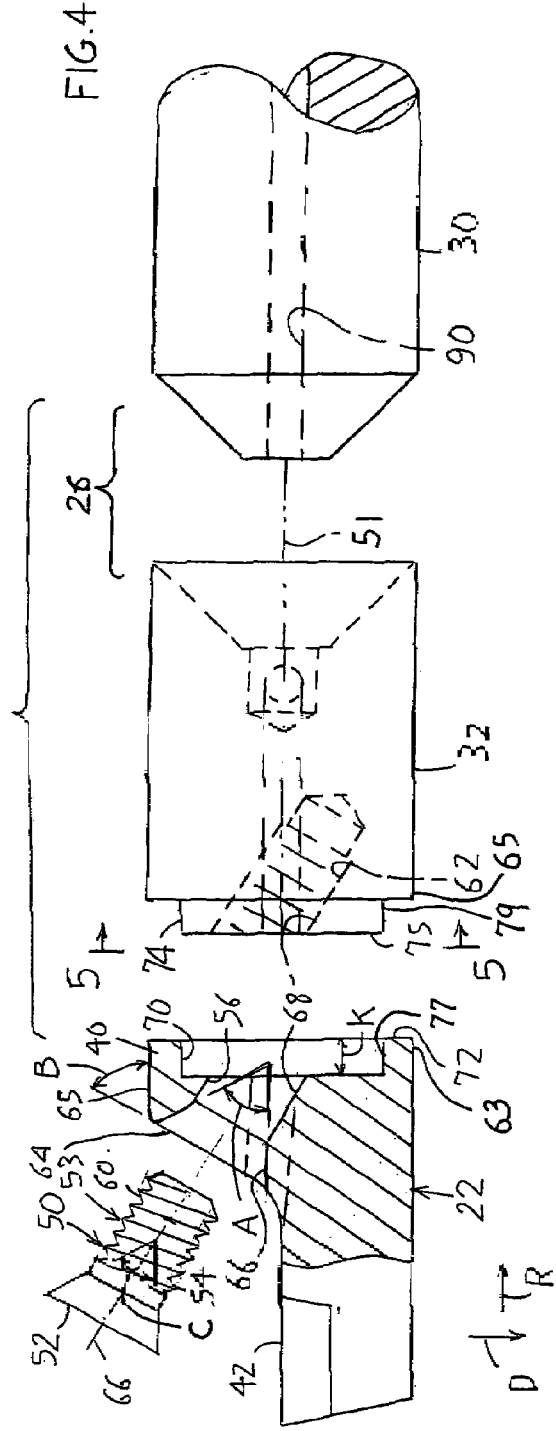
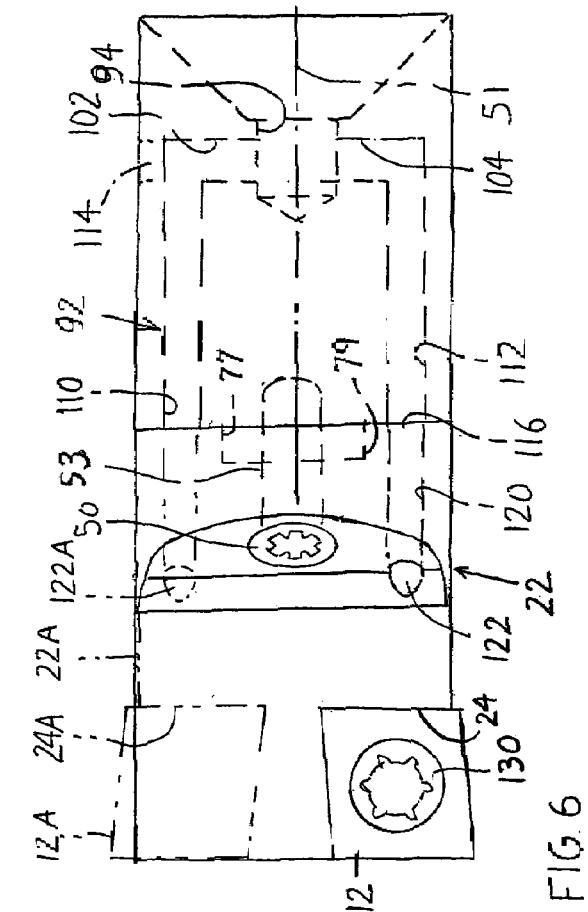
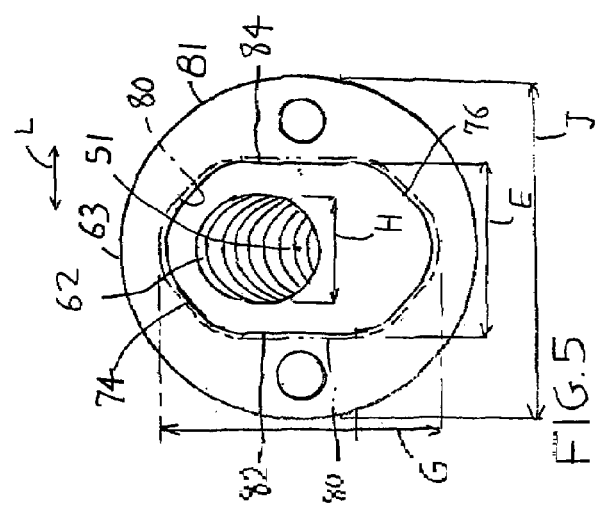

MINIATURE CUTTING INSERT HOLDER

BACKGROUND OF THE INVENTION

Small holes drilled into a workpiece can be machined to form a precision finished surface on the hole walls, by rotating the workpiece on a lathe while a cutting insert is advanced within the hole. The cutting insert is mounted in a pocket of a holder head. It is often desirable to detachably mount the holder head on a holder bar device so the head can be replaced. In prior systems, holder heads on bar devices of ⅝th inch and larger diameters are held by a multiple screw/multiple serration system. In that system, precision mounting of the head on the bar device is achieved by miniature screws and multiple serrations on each part that interfit. For bar diameters of under ⅝th inch the cost to manufacture a screw and serration configuration makes such system impractical. In prior art systems for bar diameters under ⅝th inch the holder device is simply brazed to the bar device in a one piece construction.

It would be desirable if a machining apparatus were available that could be practically built on smaller shanks such as those of ⅜ths inch diameter, and that was of simpler and lower cost construction. If the holder head could be easily replaced on the bar device, a holder head could be used that had an insert-holding pocket that could receive a particular type of cutting insert, and a damaged head could be replaced on a holder device without removal from the machine tool.

SUMMARY OF THE INVENTION

In accordance with one embodiment of the invention, a cutting insert holder is provided, of the type that has a head with a pocket that holds the cutting insert, wherein the head is easily detachable from a bar device in a construction that is of low cost and that allows the holder to fit into a small workpiece hole. The head has a front part that holds the cutting insert and that is of small height, and has a rear part that is of a greater height about equal to that of the bar device. A screw extends through a hole in the head rear part and through a threaded hole in the front of the bar device, to hold the head securely on the bar device. A recess and projection are provided, one on the rear of the head and the other on the front of the bar device, to precisely locate the head on the bar device. The screw extends within the recess and projection, so widely-spaced locating surfaces are provided on the recess and projection.

The screw-receiving holes in the head and bar device, preferably extend at a downward-rearward incline. The front surface of the head rear part preferably extends at a downward-forward incline, and the screw has a tapered head that fits into a tapered end of the inclined hole in the head rear part.

The bar device includes a rigid bar of tungsten carbide and a carbon steel mount brazed to the front end of the bar. A coolant bore extends through the middle of the bar along its axis. The mount forms a passage system that allows the coolant to flow to either side of the mount. The head has a coolant passage at the same side of the head in which the insert-holding pocket lies. This allows coolant to be directed parallel to the axis, but at the cutting insert.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partial rear isometric view of a cutting apparatus of the invention, shown with a front portion lying in a hole of workpiece, the workpiece being shown in phantom lines.

FIG. 2 is a left side elevation view of the cutting apparatus of FIG. 1, with portions shown in hidden lines.

FIG. 3 is a plan view of the cutting apparatus of FIG. 2

FIG. 4 is an exploded side elevation view, with a portion shown in section, of the cutting apparatus of FIG. 2, with only a portion of the bar being shown.

FIG. 5 is a view taken on line 5-5 of FIG. 4.

FIG. 6 is a top view of the head and mount of FIG. 3, and shows in phantom lines a head with a left hand cutting insert.

DESCRIPTION OF THE PREFERRED EMBODIMENTS

FIG. 1 shows a cutting apparatus 10 of the present invention, which includes a cutting insert 12 that has been advanced forwardly F so it lies in a hole 14 of a workpiece 16. The workpiece is mounted on a lathe spindle that turns the workpiece. The insert is held by a holder 20 that includes a head 22 with a pocket 24 that receives the cutting insert. The holder also includes a bar device 26 formed by a shank or bar 30 and a mount 32 that forms a front part of the bar device and that is fixed to the front end of the bar. The head 22 is detachably mounted on the mount 32. In the prior art, the smallest practical cutting apparatus with detachable head could fit only into a hole of ⅝th inch or greater diameter. A smaller cutting apparatus could be made by fixing the head to the bar device by brazing, but then the head is not detachable from the bar device.

FIG. 2 shows that the head 22 has a rear part 40 with a height in a vertical direction V that is about the same as the height of the bar device 26. The head also has a head front part 42 of about half the height of the rear part. This results in the upper surface 46 of the head front part lying at about the proper height for the top of the insert 12. The rod 30, mount 32, and rear part 40 of the head all have a cross-section of primarily cylindrical shape (closer to a cylinder than square) of the same height, at least for smaller sizes such as to fit in holes of under one inch diameter.

In accordance with the present invention, the head 22, shown in FIG. 4, is detachably fastened to the mount 32 by a head screw 50. The head screw extends at a downward D and rearward R incline as seen in a side view, and lies on the centerline or axis 51 of the head and of the bar device as seen in a top view. The particular incline angle A is 30° from the horizontal. The head screw has a screw head, or screw front part 52, and a screw shank 53. The screw shank has a shank front part 54 that lies in a screw-receiving hole 56 in the head. The screw has a threaded shank rear part 60 that lies in threadable engagement with a threaded screw-receiving hole 62 in the mount. The two screw-receiving holes 56, 62 can be considered to be a screw-receiving orifice 68. The rear part 40 of the head has a front surface 64 that extends from the top 65 of the head rear part and that is inclined at an angle of more than 10° from the vertical with angle B being 60° from the horizontal. As a result, the screw centerline 66 extends at about a right angle to the inclined surface 64. The circumference of the screw head 52 is tapered, preferably with a small taper angle C, and the front of the screw-receiving hole is similarly tapered. Applicant uses conical surfaces with a taper angle C of less than that of the most common taper angle of 82.5° for such "finishing" screws. The small taper angle C which is preferably less than 70° and which is shown as 60° results is the rear end of the screw head 52 having a smaller diameter to fit into the small space available for it on the inclined surface 64.

The head 22 is precisely located on the mount 32 by a recess 70 in the rear mating end 72 of the head that closely receives a projection 74 at the front mating end 75 of the mount of the holder. It can be seen that the interfitting surfaces 77, 79 of the recess and projection extend parallel to the axis 51 as seen in sectional views such as FIGS. 4 and 6 that are perpendicular to each other and that are perpendicular to the axis. The head and holder have exposed outside surfaces 63, 65 at their engaging ends, and the projection and recess lie inside those outside surfaces. FIG. 5 shows that the recess, whose recess walls are indicated at 80, is of larger lateral L, or horizontal width E and larger vertical height G than the screw-receiving hole 62 in the mount (and than the screw-receiving hole in the head). The recess lies on a closed curve and all parts of the recess lie closer to the axis 51 than the distance from the outside surface 81 of the bar device to the axis. The head screw has a shank diameter H that is more than one-fourth the width or diameter J of the cylindrical mount and of the head rear end, so the screw can withstand large forces encountered in machining. The fact that the locating surfaces of the recess and projection 70, 74 have greater widths and heights than such a large diameter head screw, results in the ability to provide precision locating of the head on the mount.

The projection 74 shown in FIG. 5 has long vertical surfaces 82, 84 on opposite sides of the screw-receiving hole, which fit closely between vertical walls of the recess, with a clearance between them no more than about one mil (one mil equals one-thousandth of an inch) ("about" means no more than 1.5 mil). This assures high precision in horizontal locating of the head on the mount. The projection has 45° inclined top and bottom surfaces 76 that locate the head on the mount with moderate precision (clearance of about 3 mils) because precision locating in the vertical direction is not as important as precision locating in the horizontal direction.

The recess and projection each have a length K (FIG. 4) along the axis 51 that is about one-eighth the height of the head rear part. Such small length of less than 25% of the bar device height G is desirable to assure that high torque encountered in machining is not applied to the projection walls to bend them.

The bar or shank 30 is usually constructed of tungsten carbide to assure high rigidity. The mount 32 is constructed of carbon steel which can be machined far more easily than tungsten carbide. The head is also constructed of carbon steel. The bar 30 is formed with a coolant bore 90 that preferably extends along the bar axis 51. Applicant uses the mount to direct the coolant around the screw holes and around the locating recess and projection, and also to better distribute coolant to where it is needed. As shown in FIG. 6, the mount has a passageway system 92 which includes a middle part 94 lying on the axis 51, a pair of sidewardly-extending passage parts 102, 104 that extend from the middle part, and a pair of longitudinally-extending parts 110, 112 that extend primarily parallel to the axis. These parts of the passage system are drilled in the mount, with a plug of material (not shown) at 114 to close passage part 102. The head rear end has one opening 116, which is aligned with the leftward passage part 112. The head rear part has a coolant conduit 120 that extends forwardly from the opening 116 and that has a front end 122 that lies directly behind the cutting insert and that directs coolant along the upper surface of the head front part to the upper surface of the cutting insert 12. This efficiently uses the coolant because the coolant is directed at the location where cutting occurs. If a head is used with a pocket and cutting insert located on the right side of the head then such head will have a passage aligned with the right side passage part 110.

Applicant's head can be removed and a new one installed, in much less time than for prior detachable heads. This allows a machinist to remove a cutting insert that has a worn or broken cutting edge, by replacing the head with another one containing a cutting insert with a fresh cutting edge. The small insert screw 130 (FIG. 3) that holds the cutting insert to the head is often inconvenient to reach, and the small screw is commonly fumbled when removing and reinstalling it. As a result, such screws often drop into a space where they cannot be recovered. It is much easier to replace the entire head because the head screw 50 that holds the head in place is much larger (e.g. the head screw 50 may be of 3 mm diameter while the insert screw 130 is of about 1.5 mm diameter). Removal of the entire head allows the machinist to check the pocket that holds the cutting insert for possible deformation, and allows removal of the cutting insert to reinstall it with a new cutting edge in position to cut or to replace it, in a convenient location where there is light and a fumbled small screw will drop onto a table top.

The shank 53 (FIG. 6) of the head screw lies on the axis 51 of the holder 20, but extends at a downward-rearward incline. The threaded shank rear part 60 (FIG. 4) of the head screw, threadably engages the threaded hole 62 in the mount both above and below the axis 51 for optimum fastening. It would be desirable if the head screw extended along the axis 51, but the head front part 42 is in the way. The inclined head screw is a good compromise. FIG. 6 also shows, in phantom lines, a head 22A with a pocket 24A for holding a left hand cutting insert 12A, and with a coolant conduit front end 122A for directing coolant at the cutting edge of the left hand cutting insert.

Although terms such as "top", "down", etc. have been used to describe the invention as it is illustrated, it should be understood that the holder can be used in any orientation.

Thus, the invention provides a machining apparatus of the type wherein the head is detachable from the bar device, which can be manufactured in smaller sizes than previously, which allows detachment and reattachment more rapidly and with greater ease, which provides a stronger connection and one that assure greater head-locating precision, and which provides better coolant direction. The head is attached to the bar device by a head screw that extends into a rear head part and that extends at an incline into the front part of the bar device. A screw-receiving orifice is shown which extends at a rearward-downward incline and with the screw head bearing against the head rear part. However, it is possible to use an upward-rearward incline and/or have the screw head bear against the mount. The head and bar device form a mating recess and projection that both lie around the screw and that precisely locate the head on the bar device. The rear part of the head preferably has an inclined surface that extends at a downward-forward incline, and the screw has a tapered head that lies in a front end of the screw-receiving hole in the head. The bar device directs coolant along two laterally-spaced passage parts, and the head has a conduit that directs coolant from a passage part at one side of the head to a location at the top of the cutting insert.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for machining a workpiece, which includes a holder having an axis extending in front and rear directions and having a holder front mating end, and a head with a rear mating end fixed to said holder front mating end, said head forming a pocket and including a cutting insert mounted in said pocket, said holder front mating end and said head rear mating end are constructed with one having a projection and the other having a recess that closely receives the projection, to accurately locate the head and the cutting insert thereon with respect to the holder, said holder front mating end and said head rear mating end having aligned screw-receiving holes with one of said holes being threaded and including a screw that extends at least partially through said holes to fasten said head to said holder, wherein:

said projection and recess each having interfitting surfaces that form a projection and recess with perimeters that lie outside said screw-receiving holes and that precisely align said head to said holder;

as seen in views taken along said axis, said projection and said recess each has a pair of vertical parallel opposite sides with portions lying on opposite sides of the corresponding screw hole and with said screw holes each lying directly between locations on said vertical parallel opposite sides, said parallel opposite sides being spaced apart at a constant distance so said projection can be inserted into said recess by movement of one towards the other along said axis.

2. The apparatus described in claim 1 wherein:

said recess is larger than said screw hole and said recess extends in a closed curve around said screw hole, as viewed along said axis, with the closed curve lying within and spaced from an outside surface of the part that forms the recess and with the projection fitting closely in the recess to avoid both vertical and horizontal relative movement of the holder with respect to the load.

3. The apparatus described in claim 1 wherein:

said parallel opposite sides are horizontally spaced apart by a predetermined distance (E) and said recess has a height greater than said predetermined distance;

said holder and head are parts that each has at least one coolant passage with a coolant passage end lying between an outside surface of the part and one of said pair of vertical parallel sides, as seen in a view along said axis.

* * * * *